(12) United States Patent
Zimmermann et al.

(10) Patent No.: US 6,862,932 B2
(45) Date of Patent: Mar. 8, 2005

(54) LIQUID LEVEL SENSOR

(75) Inventors: Bernd D. Zimmermann, Ashland, OH (US); David Reynolds, Galion, OH (US); Richard L. Gerich, Mansfield, OH (US)

(73) Assignee: Therm-O-Disc, Incorporated, Mansfield, OH (US)

( * ) Notice: Subject to any disclaimer, the term of this patent is extended or adjusted under 35 U.S.C. 154(b) by 0 days.

(21) Appl. No.: 10/402,261

(22) Filed: Mar. 28, 2003

(65) Prior Publication Data

US 2003/0183001 A1 Oct. 2, 2003

Related U.S. Application Data

(63) Continuation-in-part of application No. 09/809,480, filed on Mar. 15, 2001, now Pat. No. 6,546,796.

(51) Int. Cl.[7] .............................................. G01F 23/00
(52) U.S. Cl. ...................... 73/295; 73/290 R; 73/866.5
(58) Field of Search ............................... 73/295, 290 R, 73/866.5

(56) References Cited

U.S. PATENT DOCUMENTS

| | | | |
|---|---|---|---|
| 2,279,043 A | 4/1942 | Harrington | 73/295 |
| 3,279,252 A | 10/1966 | Barlow | 73/295 |
| 3,613,050 A | 10/1971 | Andrews | 339/117 R |
| 3,922,658 A | * 11/1975 | Harper et al. | 340/622 |
| 4,032,363 A | * 6/1977 | Raag | 136/211 |

(List continued on next page.)

FOREIGN PATENT DOCUMENTS

| | | |
|---|---|---|
| DE | DT 2035154 | 1/1971 |
| DE | 38 17895 | 1/1989 |
| DE | 37 36 208 | 5/1989 |
| DE | 38 02 225 | 7/1989 |
| DE | 40 30 401 | 9/1991 |
| EP | 0248504 | 6/1987 |
| EP | 0340309 | 10/1987 |
| GB | 7462 | 3/1914 |
| JP | 55 44923 | 9/1978 |
| JP | 56 6116 | 6/1979 |
| JP | 57158522 | 9/1989 |
| JP | 5 281167 | 3/1992 |
| WO | WO 9100452 | 3/1991 |

*Primary Examiner*—Hezron Williams
*Assistant Examiner*—Rodney T. Frank
(74) *Attorney, Agent, or Firm*—Harness, Dickey & Pierce, PLC

(57) ABSTRACT

An improved liquid level sensor is disclosed which provides a reliable and simple device for accurately determining the level of a liquid within a vessel. The sensor utilizes a plurality of thermocouple junctions grouped in pairs with the pairs being spaced along a line extending generally in the direction in which the liquid level may vary. A first thermocouple junction of each pair is located in relatively close thermal proximity to an electrically powered heater and the second of each pair of thermocouple junctions is spaced away from the heater. The thermocouple junctions are connected in series and produce a signal indicative of the level of liquid along the sensor. Alternatively, a single threshold liquid level sensor is provided for use with a hermetic interface to provide a signal to indicate a level of liquid within a container. Additionally, a pressure sensing circuit may also be incorporated with either liquid level sensor.

18 Claims, 10 Drawing Sheets

U.S. PATENT DOCUMENTS

| | | | | |
|---|---|---|---|---|
| 4,065,760 A | * | 12/1977 | Feldon | 340/622 |
| 4,423,629 A | | 1/1984 | Ara et al. | 73/295 |
| 4,638,291 A | | 1/1987 | Puscasu | 340/59 |
| 4,771,271 A | | 9/1988 | Zanini-Fisher | 340/620 |
| 4,800,732 A | | 1/1989 | Newton | 62/236 |
| 4,969,749 A | | 11/1990 | Hasselmann | 374/115 |
| 5,022,263 A | | 6/1991 | Uriu et al. | 73/295 |
| 5,103,368 A | | 4/1992 | Hart | 361/284 |
| 5,201,223 A | | 4/1993 | McQueen | 73/295 |
| 5,243,492 A | | 9/1993 | Marquit et al. | 361/247 |
| 5,256,042 A | | 10/1993 | McCullough et al. | 418/1 |
| 5,397,661 A | | 3/1995 | Kaun | 429/181 |
| 5,553,494 A | | 9/1996 | Richards | 73/304 R |
| 5,730,026 A | | 3/1998 | Maatuk | 73/295 |
| 5,831,159 A | | 11/1998 | Renger | 73/204.24 |
| 5,861,811 A | | 1/1999 | Lease et al. | 340/608 |
| 5,908,985 A | * | 6/1999 | Maatuk | 73/295 |
| 6,024,487 A | | 2/2000 | Gillen et al. | 374/121 |
| 6,098,457 A | | 8/2000 | Poole | 73/295 |
| 6,415,182 B1 | | 7/2002 | Ibrahim | 607/36 |
| 6,576,972 B1 | * | 6/2003 | Parsons | 257/470 |
| 6,649,994 B2 | * | 11/2003 | Parsons | 257/470 |
| 6,765,278 B2 | * | 7/2004 | Parsons | 257/470 |
| 6,776,037 B2 | * | 8/2004 | Maatuk | 73/295 |
| 2002/0110344 A1 | | 8/2002 | Jin | 385/138 |
| 2002/0129650 A1 | | 9/2002 | Zimmermann et al. | 73/295 |

* cited by examiner

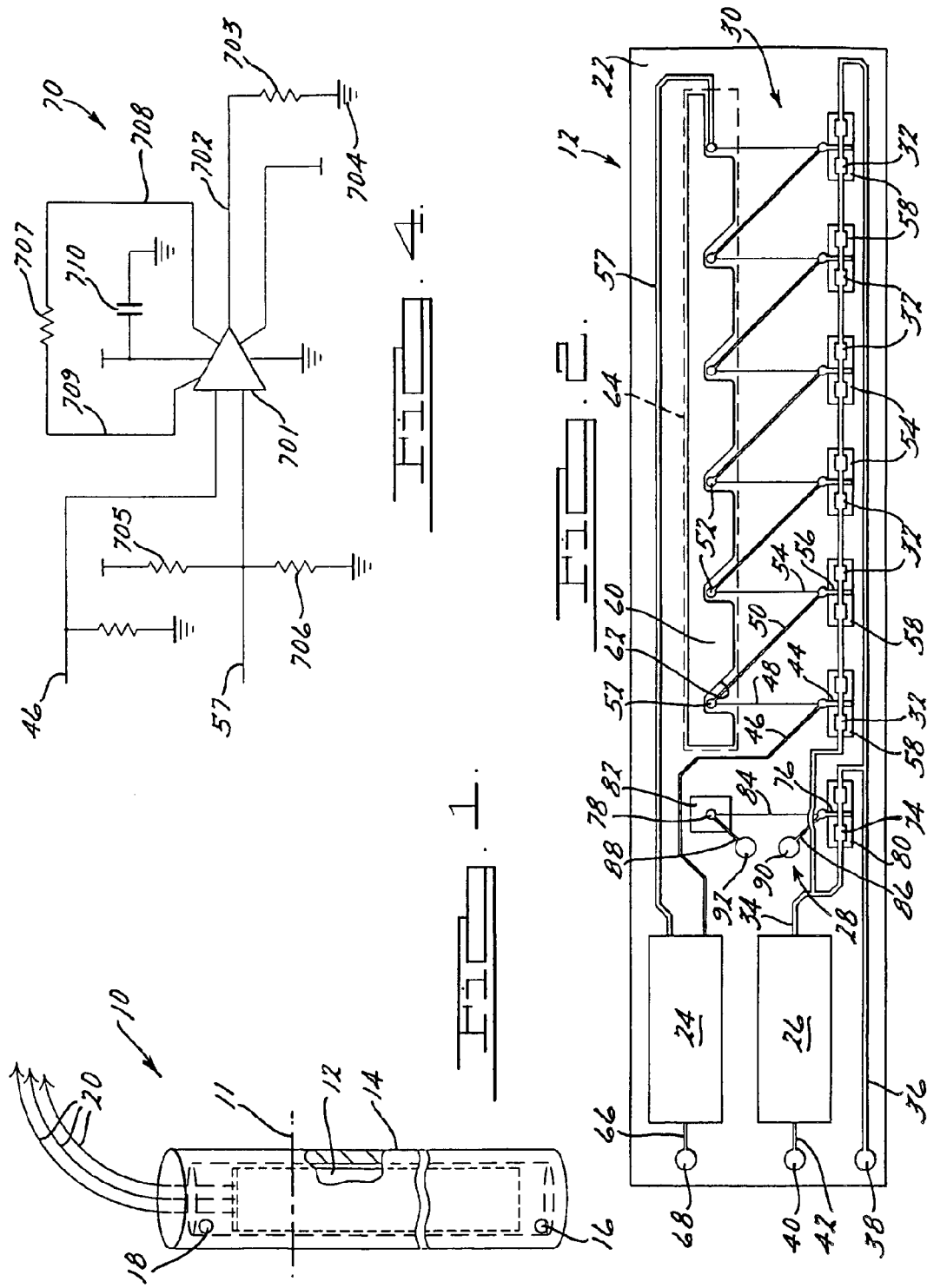

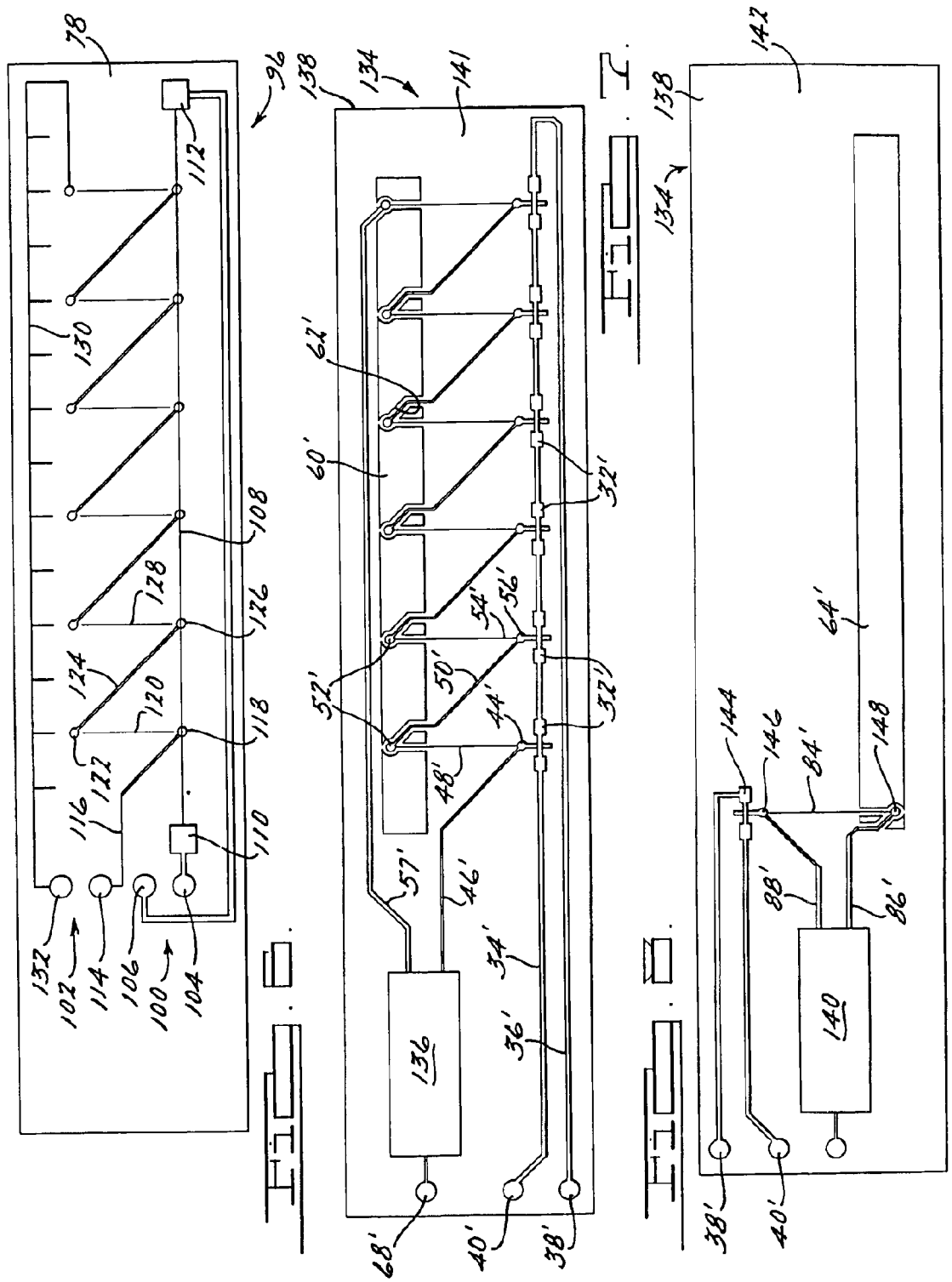

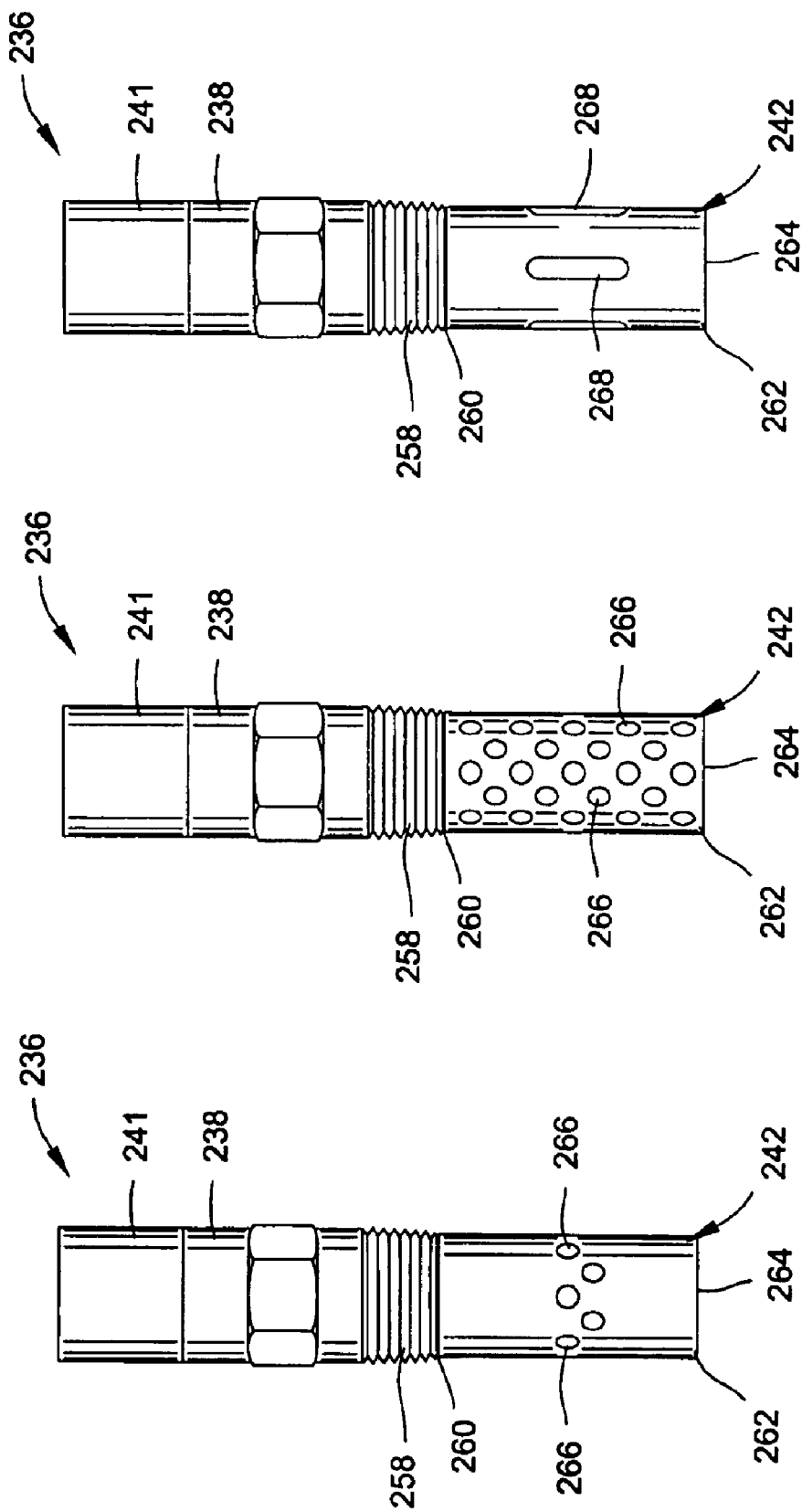

LIQUID LEVEL SENSOR

CROSS-REFERENCE TO RELATED APPLICATIONS

This application is a continuation-in-part of U.S. Pat. application Ser. No. 09/809,480, filed Mar. 15, 2001 now U.S. Pat. No. 6,546,796.

BACKGROUND AND SUMMARY OF THE INVENTION

The present invention relates generally to devices used to measure the level of a liquid within a vessel or container and more specifically to such a device which employs a plurality of serially connected thermocouple junctions arranged in laterally spaced pairs with respective thermocouple junctions of each pair being positioned in substantially parallel spaced rows.

There exists a wide variety of applications in which it is desirable to monitor to some degree the level of a liquid within a vessel or the like. Such applications may range from monitoring various fluid levels within a motor vehicle or internal combustion engine or fuel tank to monitoring oil levels within a pump or compressor or even water levels within a tank such as for a recreational vehicle or boat. In each of these applications it is desirable that the liquid level sensor be capable of providing a reliable accurate indication of the liquid level over an extended period of time without requiring periodic maintenance. In many applications the level sensor must be capable of enduring various levels of vibration, heat or other hostile environmental elements as well as space limitations. Additionally, in some applications utilizing sealed vessels such as hermetic compressors, it is desirable to minimize the number of penetrations such as electrical leads through the walls of the vessel to reduce the potential for leakage.

Various types of devices have been developed over the years for sensing such levels of liquids. Such devices range from the extremely simple float arrangement commonly employed in fuel tanks to more complex electrical capacitance type sensors as well as microprocessor based thermocouple sensors. While operable, these various types of sensors have had varying drawbacks depending upon the particular application such as excessive space requirements for accommodating movable floats and associated linkage, relatively high costs to manufacture, complexity of circuitry required to generate a level indicating signal, susceptibility to errors from extended or extraneous electrical noise, lack of resistance to hostile environmental elements, etc.

The present invention overcomes these drawbacks inherent in the prior art sensors by providing an extremely reliable sensor which is compact and simple in design and can be manufactured at very low costs. Further the present invention can be encapsulated or coated with a variety of suitable materials to enable it to maintain prolonged operation in numerous different and potentially hostile environments. The sensor of the present invention incorporates a first plurality of thermocouple junctions arranged along a substrate with a suitable heater arranged in close proximity thereto. In order to compensate for ambient temperature, a second compensating thermocouple junction is associated with each of the first thermocouple junctions and laterally spaced therefrom. The thermocouple junctions are interconnected in series with respective first and second thermocouple junctions alternating in the serial interconnection. The first ones of the thermocouple junctions provide an indication of the rate of heat dissipation which is directly related to the nature of the fluid surrounding the thermocouple junction while the second thermocouple junctions provide a compensation factor dependent upon the ambient temperature. This arrangement not only provides a very simple and reliable device for measurement of liquid levels within a container but further minimizes the number of leads that must extend through the wall of the container which may be important particularly if the liquid to be measured is part of a closed system such as for example a refrigeration system.

In another embodiment, the sensor of the present invention is a single threshold level sensor including a first thermocouple junction having a suitable heater arranged in close proximity thereto. A second compensating thermocouple junction is interconnected with the first thermocouple junction and is laterally spaced therefrom in order to compensate for ambient temperature. The first thermocouple junction provides an indication of the rate of heat dissipation which is directly related to the nature of the fluid surrounding the thermocouple junction while the second thermocouple junction provides a compensation factor dependent upon the ambient temperature. This arrangement similarly provides a simple and reliable device for measurement of liquid levels within a container while minimizing the number of leads that extend through the wall of the container.

A hermetic interface is further provided for use with the foregoing single threshold level sensor. The hermetic interface is provided to effectively seal the container generally around an area in which the sensor extends through a container wall and includes an amplifying circuit, a glass seal, and a protective shield. The hermetic seal is operable to seal the area generally around an input from the single level threshold sensor while concurrently allowing a signal from the single threshold level sensor to be received by the amplifying circuit. Specifically, the glass seal is generally bonded directly to a first series of leads extending from the amplifying circuit, thereby sealing an interior volume of the container while allowing communication through the first leads of the amplifying circuit. The first leads are selectively connected to a second series of leads extending from the single threshold level sensor for electrical communication therebetween. Finally, the protective shield axially surrounds the single threshold level sensor and serves to protect the sensor from sloshing of a fluid disposed within the container. In this manner, the hermetic interface effectively seals the container while concurrently allowing an electrical signal to be transmitted from the single threshold level sensor to the amplifying circuit.

Additional advantages and features of the present invention will become apparent from the subsequent description and the appended claims taken in conjunction with the accompanying drawings.

BRIEF DESCRIPTION OF THE DRAWINGS

FIG. 1 is diagrammatical view of a liquid level sensor positioned within an enclosure which is adapted to be supported within a vessel all in accordance with the present invention;

FIG. 2 is a plan view of the sensor of the present invention shown with a signal amplifier and power supply incorporated therein;

FIG. 4 is a circuit diagram for an exemplary liquid level signal conditioning circuit to be incorporated into the sensor of the present invention;

FIG. 6 is a plan view similar to that of FIG. 2 but showing another embodiment of the sensor in accordance with the present invention;

FIG. 7 is a view similar to that of FIG. 2 but showing a presently preferred embodiment of the present invention;

FIG. 8 is a view of the backside of the embodiment of FIG. 7;

FIG. 17 is a perspective view of the hermetic interface of FIG. 15 having a first protective shield disposed thereon;

FIG. 18 is a perspective view of the hermetic interface of FIG. 15 having a second protective shield disposed thereon;

FIG. 19 is a perspective view of the hermetic interface of FIG. 15 having a third protective shield disposed thereon.

DESCRIPTION OF THE PREFERRED EMBODIMENTS

Figure 3:
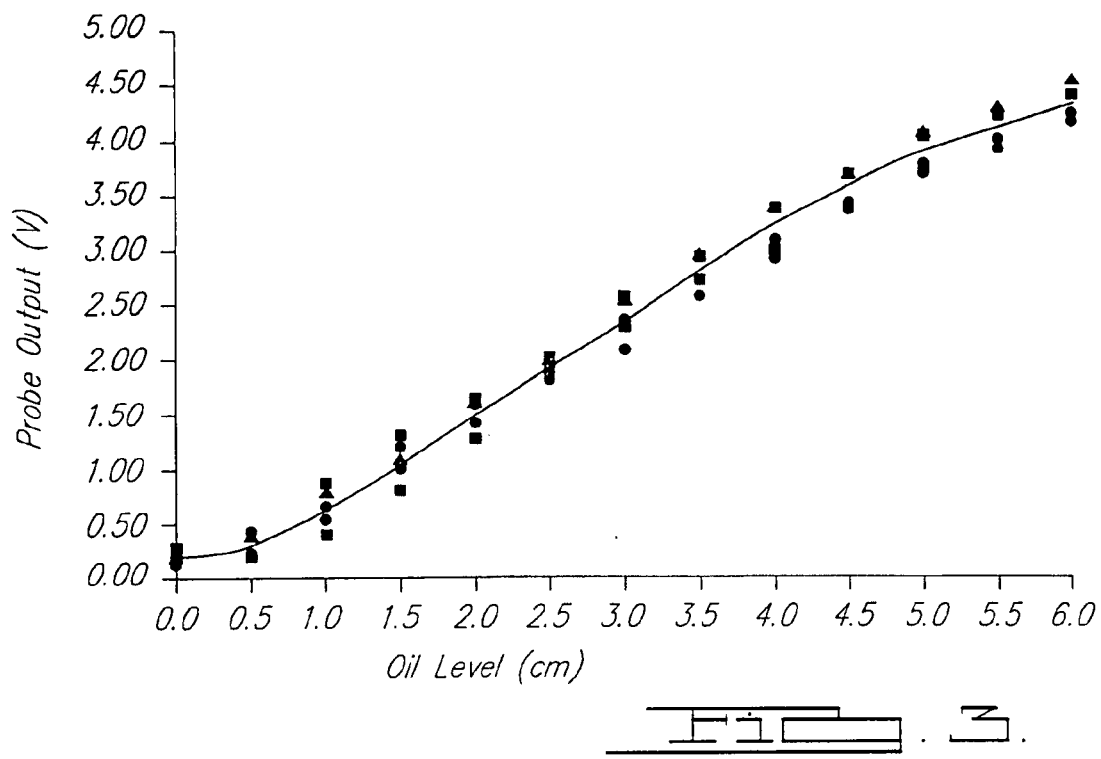
FIG. 3 is a graphical representation showing the voltage output as a function of oil level for a group of five different test sensors of the present invention.

Referring now to the drawings and in particular to FIG. 1, there is shown a liquid level sensor 10 in accordance with the present invention. Liquid level sensor 10 comprises a printed circuit board 12 disposed within a hollow generally cylindrically shaped container 14. Preferably container 14 will be closed at least at the lower end thereof and will have one or more holes 16, 18 opening into the interior adjacent each end thereof. Holes 16 enable liquid to flow into or out of the interior of container 14 whereas holes 18 allow gases to flow into and out of container 14. As shown, a plurality of leads 20 extend outwardly from circuit board 12 through the upper end of container 14. Container 14 serves to dampen the changes in liquid level which may occur as a result of movement of the vessel within which the liquid is contained and/or agitation of the liquid resulting from movement of apparatus within the liquid containing vessels. The specific number of holes 16 and 18 at each end as well as the size thereof may be varied depending on the viscosity of the liquid whose level is to be sensed as well as the degree of anticipated agitation of the liquid and desired responsiveness of the sensor. That is to say, increasing the number and/or size of the holes will enable the sensor to respond more rapidly to changes in liquid level but may result in a greater number of errors due to transient changes in the liquid level resulting from agitation of the liquid. Similarly, fewer and/or smaller holes will result in reduced sensitivity to agitation of the liquid but may increase the time required to sense a sudden drop in the liquid level. It should be noted that container 14 may be open at one or both ends in lieu of or in addition to providing holes 16 and 18 or alternatively holes 16 and 18 may be replaced by one or more slots. Container 14 may be fabricated from any material suitable for the environment within which it may be utilized including for example polymeric compositions or various metals. Alternatively, container 14 may be integrally formed with a portion of the vessel within which the liquid is contained or as part of other apparatus disposed within the vessel. It should also be noted that container 14 may in some applications be in the form of a suitably shaped shield sufficient to protect circuit board 12 from splashing of the liquid which could result in erroneous level readings or if splashing is not of concern, the shield or container may be eliminated in its entirety.

Referring now to FIG. 2, printed circuit board 12 is shown and includes a relatively rigid elongated substrate 22 upon which signal conditioning circuitry 24, a power supply circuitry 26, a pressure sensing thermocouple junction assembly 28, and a liquid level sensing assembly 30 are supported. Substrate 22 may be fabricated from a variety of different materials but will preferably be made from a suitable printed circuit board material having good electrical insulating capabilities and preferably resistant to degradation from the environment in which it will be utilized. It is also preferable that the material be relatively thin to promote heat transfer from one surface to the other and to promote faster response time.

The liquid level sensing assembly 30 includes a plurality of substantially identical heating resistors 32 positioned in spaced relationship extending along one side of the substrate 22 and interconnected in series relationship. Power is supplied to one end of the string of heating resistors 32 from power supply circuitry 26 via lead 34 and a ground lead 36 extends along the edge of substrate 22 to contact 38 at one end of substrate 22. A second contact 40 is provided adjacent contact 38 and includes lead 42 extending to power supply circuitry 26 for supplying power to printed circuit board 12. A first hot thermocouple junction 44 is provided comprising the juncture between copper lead 46 and Constantan lead 48. Constantan lead 48 extends laterally of substrate 22 to a point where it is joined to a second copper lead 50 to thereby form a second cold thermocouple junction 52. Copper lead 50 in turn extends diagonally across substrate 22 to a point which is positioned generally longitudinally aligned with but longitudinally spaced from first thermocouple junction 44. Copper lead 50 is then joined to another Constantan lead 54 to form a second hot thermocouple junction 56. This alternating interconnection of copper leads and Constantan leads is repeated to thus provide a first longitudinally extending array of spaced hot thermocouple junctions arranged generally in longitudinally aligned relationship extending adjacent one edge of the substrate 22 and a second longitudinally extending array of spaced cold thermocouple junctions also arranged generally in longitudinally aligned relationship adjacent the opposed edge of substrate 22. A return lead 57 extends from the rightmost (as shown) thermocouple junction along the upper edge of substrate 22 to signal conditioning circuitry 24.

In order to promote heat transfer to the respective hot thermocouple junctions 44, 56, a copper pad 58 may be positioned in underlying relationship to each of the heating resistors 32. Preferably each resistor will have its own discrete pad so as to minimize heat transfer between longitudinally adjacent thermocouple junctions. Preferably, thermocouple junctions 44, 56 will be positioned between respective copper pads 58 and respective heating resistors 32 and will be electrically insulated therefrom although copper pads 58 could be located on the opposite side of substrate 22 from thermocouple junctions 44, 56 and heating resistors 32 if desired. An elongated copper heat sink strip 60 is also provided in close proximity to cold thermocouple junctions 52. As shown, heat sink strip 60 includes a plurality of cutout portions 62 along the length thereof to accommodate and space it from the respective cold thermocouple junctions and associated leads while still positioning the heat sink in partial surrounding relationship thereto. Additionally, if desired or as an alternative to heat sink 60, an additional elongated copper heat sink 64 may be provided on the opposite surface of substrate 22 from that on which heat sink 60 and thermocouple junctions 52 are provided. Heat sinks 60 and 64 operate to minimize the effect of any heating of cold thermocouple junctions 52 that may result from heating resistors 58 thereby ensuring that cold thermocouple junctions will provide an accurate compensation factor correlated to the ambient temperature.

It should also be noted that the relative lateral positioning of the respective hot and cold thermocouple junctions should be along a line extending parallel to the surface of the liquid to be measured so as to ensure that both hot and cold thermocouple junctions of a given pair are both located above or below the liquid level surface at any given time. The lateral spacing between the respective pairs of hot and cold thermocouple junctions 44, 52 should be sufficient to minimize heating of the cold thermocouple junctions 52 by the resistors 58 associated with the hot thermocouple junctions 44. The longitudinal spacing of the respective pairs of hot and cold thermocouple junctions 44, 52 may be varied as desired to provide varying degrees of precision in the liquid level detection however they should be spaced sufficiently so as to minimize the heat transfer between longitudinally adjacent thermocouple junctions. Any number of pairs of hot and cold thermocouple junctions may be incorporated in printed circuit board 12 and the length thereof will be selected so as to ensure a sufficient number and spacing of thermocouple junctions to cover the desired range of liquid level to be sensed as well as the degree of level resolution desired.

In operation, each hot thermocouple junction 44, 56 will generate a potential, the magnitude of which will be dependent upon its temperature. Assuming a sensor such as is shown in FIG. 2 having a series of six hot thermocouple junctions 44, 56, the total voltage generated when the probe is not immersed in liquid will be six times the potential generated by a single hot thermocouple junction 44. However, if one of the hot thermocouple junctions is immersed in a liquid, the greater thermal transfer efficiency afforded by liquids as opposed to gaseous fluids will result in reduced heating of the immersed thermocouple junction by the heating resistor 58 and hence a lower potential being generated thereby. As the hot thermocouple junctions 44, 56 are interconnected in series, the potential generated by each thermocouple junction will be additive with the resulting signal being indicative of the temperatures of the thermocouple junctions and hence their presence in a gas or liquid environment.

However, the amount of heat transferred to each of the hot thermocouple junctions 44, 56 and hence the potential they may generate is also influenced by ambient temperatures. Thus it is necessary to provide a cold thermocouple junction 52 for each hot thermocouple junction. As noted above, the orientation between the copper and Constantan leads for each cold thermocouple junction 52 is reversed from that of each of the hot thermocouple junctions 44, 56. This results in each of the cold thermocouple junctions 52 generating a potential of opposite polarity to that of the associated hot thermocouple junction 44. Thus because the cold thermocouple junctions 52 are connected in series with the hot thermocouple junctions 44, 56, this opposite polarity potential will subtract from the potential generated by the hot thermocouple junctions 44, 56. The value of the cold thermocouple junctions 52 potential will be less than the potential produced by the hot thermocouple junctions 44, 56 because the heating resistor maintains the hot thermocouple junction at a temperature above ambient. Thus, as may be appreciated, the summation of potentials produced by the hot and cold thermocouple junction will produce a resulting potential which is indicative of the level to which sensor 12 is immersed in the liquid which signal is corrected to accommodate variances in ambient temperatures.

As mentioned previously, the resulting signal produced by the thermocouple junctions 44, 52, 56 is supplied to signal conditioning circuitry 24. Signal conditioning circuitry 24 may include amplification circuitry to amplify the thermocouple junction output signal as well as suitable filters to reduce electrical noise or the like. In any event, the resulting signal is outputted from signal conditioning circuitry 24 via lead 66 to contact 68. From contact 68 the resulting signal indicative of the fluid level may be supplied to suitable remote indicating means for monitoring of the liquid level as sensed by printed circuit board 12.

FIG. 3 shows the results of testing of five sample sensors of the present invention to determine the oil level in a hermetic compressor. As shown for these particular samples a relatively consistent and accurate signal was provided which indicated the oil level over a relative wide range of up to about 6 centimeters. As can be seen from this graph, the signal generated by the thermocouple junctions represents an almost linear relationship to changes in oil level. If desired, the resulting signal can be further linearized by varying the values of the individual heating resistors rather than utilizing substantially identical values therefor. Additionally, the degree of resolution may be varied by selection of the spacing of the resistors and thermocouple junctions.

While the use of serially connected thermocouple junctions provides an output signal providing both a high degree of resolution as well as an excellent signal to noise ratio, it is typically in the range of 1–4 mV. As noted above, It is therefore generally desirable to amplify this output signal and a suitable amplifier circuit is shown in FIG. 4 at 70 to accomplish this. As shown therein, an instrumentation amplifier 701 is provided which includes an output supplied via lead 702 to a load resistor 703 which is connected to ground 704. Terminal 68 of FIG. 2 provides an output signal equal to the voltage drop across resistor 703. The signal from hot and cold thermocouple junctions 44, 56, 52 is supplied to amplifier 701 via leads 46 and 57. A common mode voltage is established at lead 57 by a voltage divider circuit including resistors 705 and 706. A resistor 707 is connected across leads 708, 709 of amplifier 701 and establishes the gain which will typically be in the range of 500–1000 mV/mV. A capacitor 710 is also connected to amplifier 701 and provides power supply decoupling for the circuit 24. It is contemplated that this or another suitable amplifier circuit will be incorporated into printed circuit board 12 as part of signal conditioning circuitry 24.

Additionally, in order to ensure accurate and consistent liquid level readings it is important that the voltage applied to the resistor string and hence current flow therethrough be closely regulated (preferably +/−1%). This may easily be done by providing suitable power supply regulating circuitry 26 on circuit board 12 if desired or alternatively a remote regulated source of power may be supplied to circuit board 12 if desired.

It should be noted that both the amplification circuit as well as the regulated power supply 26 circuit may be easily integrated into the sensor itself being provided at one end of substrate 22 as shown in FIG. 2, additionally any further signal conditioning circuitry desired for a particular application may also be incorporated into substrate 22 or alternatively this and any such additional circuitry desired may be located remotely from the sensor.

Liquid level sensor 12 is specifically adapted for use in sensing the oil level within a hermetic compressor. In such an application, the sensor may be subjected to wide variations in pressure which may impair correlation of the output signal with the liquid level. The reason for this is that a given gas at a higher pressure will generally conduct heat away from the thermocouple junctions at a faster rate than the same gas at a lower pressure. Thus in some applications it may be desirable to provide a signal indicative of the ambient pressure within the liquid container. This may be accomplished by incorporating an additional heater resistor 74 in parallel with heater resistors 58, and an additional hot thermocouple junction 76 in good heat transfer relationship therewith but electrically insulated therefrom. Additionally, in order to compensate for varying ambient temperatures, an additional cold thermocouple junction 78 is provided being laterally spaced from hot thermocouple junction 76. Preferably, a copper pad 80 similar to copper pads 58 will be positioned below heating resistor 74 and a copper heat sink 82 will be positioned below thermocouple junction 78. As before, copper pad 80 and heat sink 82 will be in good thermal transfer with resistor 74 and thermocouple junctions 76 and 72 but will be electrically insulated therefrom. The operation of respective copper pad 80 and heat sink 82 will be substantially the same as described above with reference to pads 58 and heat sinks 60 and 64. As before, a Constantan lead 84 is provided between thermocouple junctions 76 and 78 and copper leads 86 and 88 extend outwardly to respective contacts 90, 92.

Figure 5:
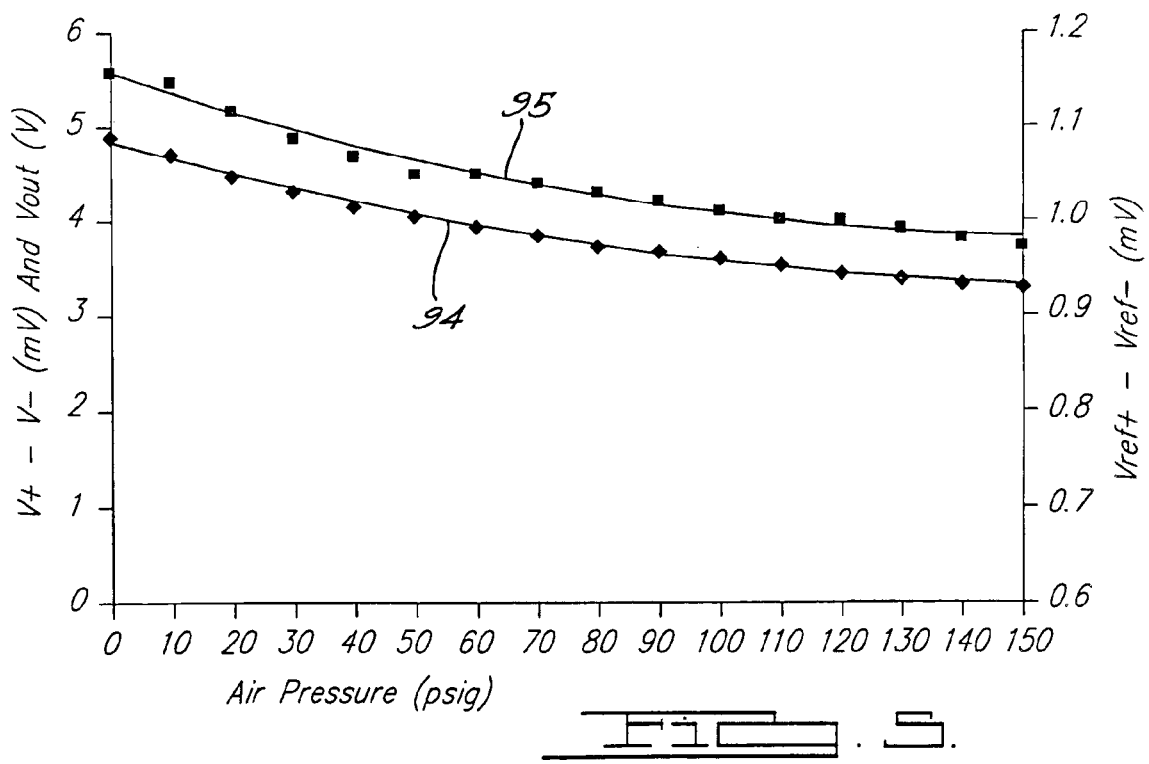
FIG. 5 is a graph illustrating the variation of output voltage as a function of pressure.

Hot and cold thermocouple junctions 76 and 78 will operate in a similar manner as described above. More specifically, resistor 80 will transfer heat to hot thermocouple junction 76 which will generate a potential indicative of its temperature. The heating of thermocouple junction 76 by resistor 80 will be offset by heat radiated or otherwise transferred to the surrounding gaseous environment. The rate at which heat is transferred to the surrounding gas will be dependent upon the pressure of the gas. That is, a greater amount of heat will be transferred when the surrounding gas is at higher pressure and thus the potential generated by hot thermocouple junction 76 will decrease as pressure increases. This is shown graphically in FIG. 5 wherein line 94 indicates the output voltage across terminals 90 and 92 provided on sensor 12 at varying air pressure. Also as mentioned above, cold thermocouple junction 78 will provide a potential of opposite polarity indicative of ambient temperature thereby reducing the net voltage output across terminals 90 and 92 to compensate for changes in ambient temperature. The graph of FIG. 5 represents a worst case scenario in which all of the level indicating thermocouple junctions are exposed to the gaseous environment (i.e., the liquid level is below the lowest pair of thermocouple junctions). Under these conditions, the liquid level signal represented by line 95 will closely track the signal from pressure indicating circuit. As increasing numbers of thermocouple junction pairs are immersed in liquid, the effect of pressure variances will decrease and hence line 95 will approach a straight horizontally extending line.

Thus, as may be apparent, the sensor of the subject invention may also provide an output signal from terminals 90, 92 to a remote location which signal is indicative of the ambient pressure within the liquid vessel and may be used for a variety of purposes including providing an overpressure alarm or to generate a correction factor for the liquid level indicating signal. If desired for a particular application, the signal from terminals 90 and 92 may be supplied to suitable signal conditioning circuitry similar to the signal from thermocouple junctions 44, 56 and 52 which circuitry may include an amplification circuit such as that described above with reference to FIG. 4. Such amplification circuitry and/or signal conditioning circuitry may be incorporated onto circuit board 12 or may be located at a remote location. It should be noted that hot and cold thermocouple junctions 76 and 78 should be positioned on substrate 22 at a locator that will maintain them above the maximum anticipated liquid level. Of course in applications where pressure variances are not of concern, these thermocouple junctions and the associated circuitry may be omitted.

Preferably, printed circuit board 12 will be coated or encapsulated with a suitable coating such as for example a silicone or epoxy coating to afford protection from the liquid and other environmental elements as well as to avoid potential shorting. Such coatings must have good heat transfer characteristics but yet must also provide sufficient electrical insulation to the components. Additionally, it is highly desirable that the coating be able to clearly shed the liquid the level of which is to be sensed so as to minimize the potential for erroneous readings resulting from clinging drops of the liquid.

It should also be noted that preferably thermocouple junctions 44, 56, and 76 will be positioned between respective copper pads 58, 80 and heating resistors 32 and 74 so as to promote heat transfer thereto. A suitable relatively thin electrical insulating film will be provided between these thermocouple junctions, the underlying copper pads and overlying resistors, however such suitable film should have good heat transfer characteristics. Additionally, heating resistors 32, 74 are preferably in the form of separate assemblies secured to substrate 22 but could alternatively be screen printed on substrate 22 in which case thermocouple junctions 44, 56, 76 would be positioned in overlying but electrically insulated relationship thereto. Further, while as described above, it is contemplated that heating resistors 32 will be substantially identical and equally spaced, this is not mandatory. The value of the individual resistors may alternatively be varied to produce a more linear relationship than that shown by the graph of FIG. 3 and/or the spacing therebetween may be varied to produce a greater degree of resolution over a particular portion of the level range if desired.

It should also be noted that while the sensor shown in FIG. 2 is designed to have the right hand end immersed in liquid with the leads extending away from the upper end thereof, this arrangement may be reversed so that the power supply and signal conducting leads extend outwardly from the lower portion thereof although it would be necessary to reposition the pressure sensing circuit to maintain it above the liquid level. Such an arrangement may be desirable to avoid the leads acting as wicks to direct liquid down across the printed circuit board 12. The sensor of the present invention may be suitably supported within an integrally formed or separately formed container such as described above or alternatively it may be openingly supported in the desired liquid containing vessel if desired for a given application.

In some applications, it may be desirable to locate only the sensor itself within the liquid container and position both the power supply and signal conditioning portions at a remote location. Accordingly, another embodiment of the present invention is shown in FIG. 6 being indicated generally at 96. Sensor 96 includes an elongated substrate 98 upon which is mounted a heater circuit 100 and a thermocouple junction circuit 102.

Heater circuit 100 includes a pair of input terminals 104, 106 to which a suitable power source may be connected, it being understood that the power source will be capable of providing a closely regulated supply of power as noted above. In this embodiment, the individual heating resistors are replaced by a suitable resistance heating wire 108 extending between contacts 110 and 112. Copper and other like highly conductive material is used to extend leads between contacts 110 and 112 and the associated terminals 104 and 106.

The thermocouple junction circuit 102 comprises a first terminal 114 from which a copper lead 116 extends to a first hot thermocouple junction 118. A Constantan lead 120 extends from the first hot thermocouple junction 118 laterally across substrate 98 to a first cold thermocouple junction 122. Another copper lead 124 then extends diagonally across the width of substrate 98 to a second hot thermocouple junction 126 from which a Constantan lead 128 extends laterally across substrate 98. As described above with reference to printed circuit board 12, this pattern repeats itself any desired number of times to provide the desired number of serially connected pairs of thermocouple junctions spaced along substrate 98. A copper lead 130 then extends from the lowermost thermocouple junction longitudinally along substrate 98 to a second terminal 132 positioned adjacent terminal 114 to complete the circuit. Suitable leads may then be connected to terminals 114 and 132 to conduct the resulting signal to a remote location. If desired a suitable heat sink may be provided on one or both sides of substrate 98 positioned in good thermal relationship to but electrically insulated from the row of cold thermocouple junctions as described above. Additionally, copper pads may be positioned below heater wire 118 at the point at which the hot thermocouple junctions overlie same if desired. Additionally, a suitable electrically insulating thermally conductive material will be positioned between the hot thermocouple junctions 118, 126 and heater wire 108 to prevent shorting therebetween. Heater wire 108 may also be screen printed thereon. Alternatively, discrete heating resistors may be used in place of heater wire 108. A pressure sensing circuit as described above may also be provided on substrate 98 if desired.

The operation of sensor 98 will be substantially identical to that described above with respect to printed circuit board 12. Further, the various optional features and modifications described above may also be equally applicable to sensor 96.

Referring now to FIGS. 7 and 8, a preferred embodiment of the present invention is illustrated being indicated at 134. Circuit board or sensor 134 is similar to that of circuit board 12 with the following exceptions. First signal conditioning circuitry 136 for conditioning and/or amplifying the signal from the liquid level sensing thermocouple junctions is located on one side 141 of substrate 138 and a second signal conditioning circuit 140 for conditioning and/or amplifying the signal from the pressure sensing thermocouple junctions is located on the opposite surface 142 of substrate 138. Additionally, heating resistor 144, hot thermocouple junction 146 and cold thermocouple junction 148 forming the pressure sensing circuit are also located on side 142 of substrate 138. Further, the copper pads 58 and 80 associated with respective heating resistors 32 and 74 are not included in this embodiment. Lastly, circuit board 134 does not incorporate an integral regulated power supply but rather is provided with power from a remotely located regulated power supply. The remaining portions of circuit board 134 are substantially identical to the corresponding portions of circuit board 12 and accordingly corresponding portions thereof have been indicated by the same reference numbers primed. The operation of circuit board 134 will in all other respects be substantially identical to that described with reference to circuit board 12 above and the various options and modifications discussed above may be incorporated into sensor 134.

Figure 9:
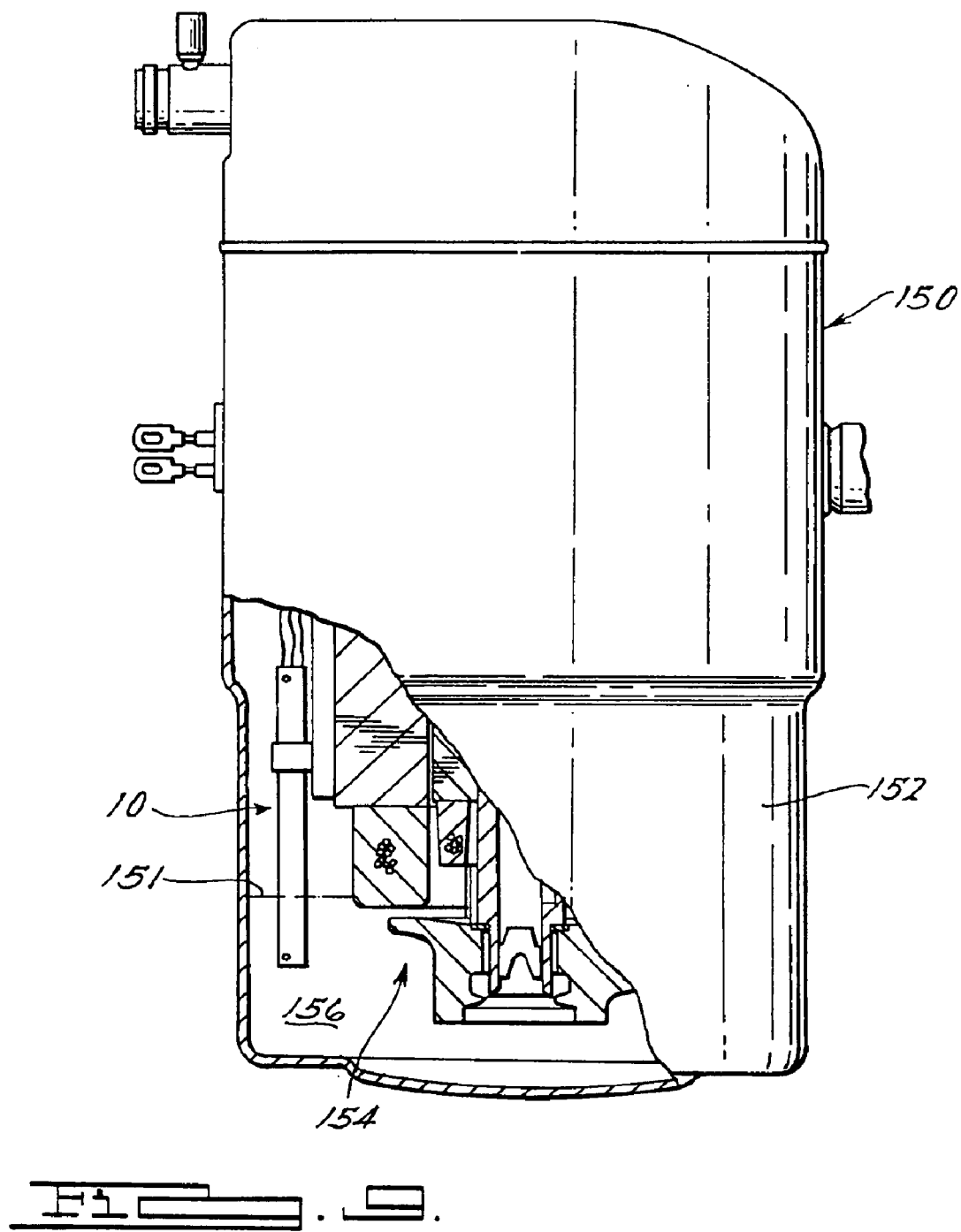
FIG. 9 is a view of a compressor with the liquid level sensor of the present invention installed therein.

As shown in FIG. 9, sensor 10, which may include any one of the above referenced circuit boards, is well suited for use in a hermetic compressor 150. Compressor 150 includes an outer shell 152 within which is disposed a motor compressor assembly 154 and an oil sump 156 in the lower portion of shell 152 for supplying oil to lubricate the motor compressor assembly 154. Sensor 10 is secured to motor compressor assembly 154 in a position so as to be particularly immersed in the oil contained in sump 156 and thus will operate to provide a signal indicative of the oil level within sump 156. It should be noted that if desired, sensor 10 may be connected to suitable remotely located apparatus to sound an alarm, deenergize the compressor or both in response to an indication that the oil level within shell 152 has dropped below a predetermined minimum. Additionally, sensor 10 may also be utilized to indicate a liquid level above a predetermined maximum and perform similar or the same functions as above.

As may now be appreciated, the liquid level sensor of the present invention provides a relatively simple and reliable means for determining the level of a liquid in virtually any vessel. The level sensor of the present invention is designed to provide continuous monitoring of the level as the heater circuit and sensing circuits are independent of each other. The sensor is well suited for economical manufacturing and requires only a very limited space to accommodate it. Further, the sensor may offer a wide degree of resolution of the level being sensed and may even accommodate increased resolution over a specific portion of the level range being sensed.

Alternatively, the liquid level sensor of the present invention may be a single threshold level sensor (STLS), as shown in FIGS. 10–14. The STLS 201 may be operable to determine the presence of liquid at a threshold level in virtually any vessel.

Figure 11:
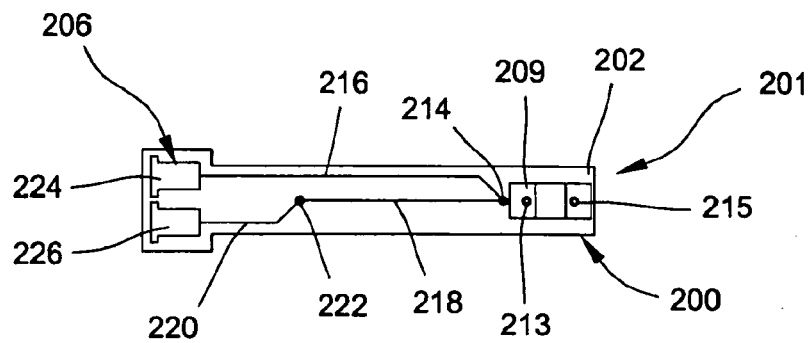
FIG. 11 is a plan view of a first embodiment of the single threshold level sensor.
Figure 12:
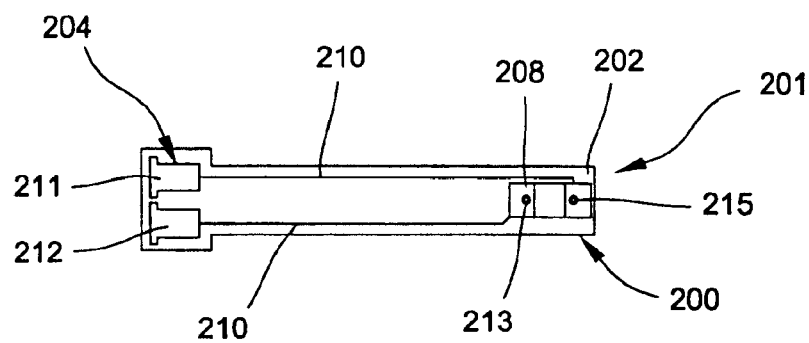
FIG. 12 is a view of the backside of the single threshold level sensor of FIG. 11.

In a first embodiment shown in FIGS. 11 and 12, the STLS 201 includes a printed circuit board 200 having a relatively rigid substrate 202 upon which a power supply circuitry 204 and a liquid level sensing assembly 206 are supported on the front and back sides, respectively, of the substrate 202. Substrate 202 may be fabricated from a variety of different materials but will preferably be made from a suitiable printed circuit board material having good electrical insulating properties and preferably resistant to degradation from the environment in which it will be utilized. It is also preferable that the material be relatively thin to promote heat transfer through the substrate from one surface to the other, and to promote a faster response time.

The liquid level sensing assembly 206 includes a pair of substantially identical heating resistors 208, 209. The resistors 208, 209 are positioned in spaced relationship on opposite sides of the substrate 202, and disposed at the distal end of the substrate 202. The resistors 208, 209 are electrically connected in parallel through electrically conductive perforations 213 and 215 in the substrate 202. Power is supplied to one end of the heating resistors 208, 209 from power supply circuitry 204 via leads 210. Specifically, a first set of contacts 211, 212 is provided extending to power supply circuitry 204 for supplying power to printed circuit board 200.

The liquid level sensing assembly 206 further includes a hot thermocouple junction 214 comprising the juncture between a first copper lead 216 and a Constantan lead 218. Constantan lead 218 extends across substrate 202 to a point where it is joined to a second copper lead 220 to thereby form a cold thermocouple junction 222, as best shown in FIG. 11. It should be understood that the first and second copper leads 216, 220 are electrically connected to a second and third contact 224, 226, whereby the second and third contacts 224, 226 are disposed at a proximate end of the substrate 202. In this manner, the second and third contacts 224, 226 are disposed adjacent the first set of contacts 211, 212 but are on an opposite side of the substrate 202.

The first and second leads 216, 220 are operable to transmit a signal from the hot and cold thermocouple junctions 214, 222 to an external signal amplification circuitry 70 through the second and third contacts 224, 226. Specifically, as signals are transmitted from the hot and cold thermocouple junctions 214, 222 to the second and third contacts 224, 226 via leads 216, 220, the signals are received by the external amplification circuitry 70. It should be understood that while an amplification circuit 70 is disclosed by the present invention generally at FIG. 4, any suitable amplification circuit for amplifying the signals received from the hot and cold thermocouple junctions 214, 222, is anticipated and should be considered as part of the present invention.

In operation, the hot thermocouple junction 214 will generate a potential, the magnitude of which will be dependent upon its temperature. Assuming a sensor such as is shown in FIGS. 11 and 12, the total voltage generated when the probe is not immersed in liquid will be the potential generated by the single hot thermocouple junction 214. However, if the hot thermocouple junction 214 is immersed in a liquid, the greater thermal transfer efficiency afforded by liquids as opposed to gaseous fluids will result in reduced heating of the immersed thermocouple junction 214 by the heating resistors 208, 209 and hence a lower potential being generated thereby.

The amount of heat transferred to the hot thermocouple junction 214, and hence the potential it may generate, is also influenced by ambient temperatures. In this manner, it is necessary to provide the cold thermocouple junction 222 in electrical communication with the hot thermocouple junction 214. The orientation between the copper and Constantan leads for cold thermocouple junction 222 is reversed from that of the hot thermocouple junction 214. This results in the cold thermocouple junctions 222 generating a potential of opposite polarity to that of the hot thermocouple junction 214. Thus, because the cold thermocouple junction 222 is connected in series with the hot thermocouple junction 214, this opposite polarity potential will subtract from the potential generated by the hot thermocouple junction 214. The value of the cold thermocouple junction 222 potential will be less than the potential produced by the hot thermocouple junction 214 because the heating resistors 208, 209 maintain the hot thermocouple junction 214 at a temperature above ambient. Thus, as may be appreciated, the potentials produced by the hot and cold thermocouple junctions 214, 222 will produce a resulting potential which is indicative of whether or not the STLS 201 is immersed in a liquid.

As mentioned previously, the resulting signal produced by the thermocouple junctions 214, 222 is supplied to an external amplification circuitry 70 via second and third contacts 224, 226. The amplification circuitry 70 is operable to amplify the thermocouple junction output signal and includes suitable filters to reduce electrical noise or the like, as shown in FIG. 4. Specifically, the signals received form the hot and cold thermocouple junctions 214, 222 are transmitted to the amplifying circuit 70 generally at leads 46 and 57.

Figure 10:
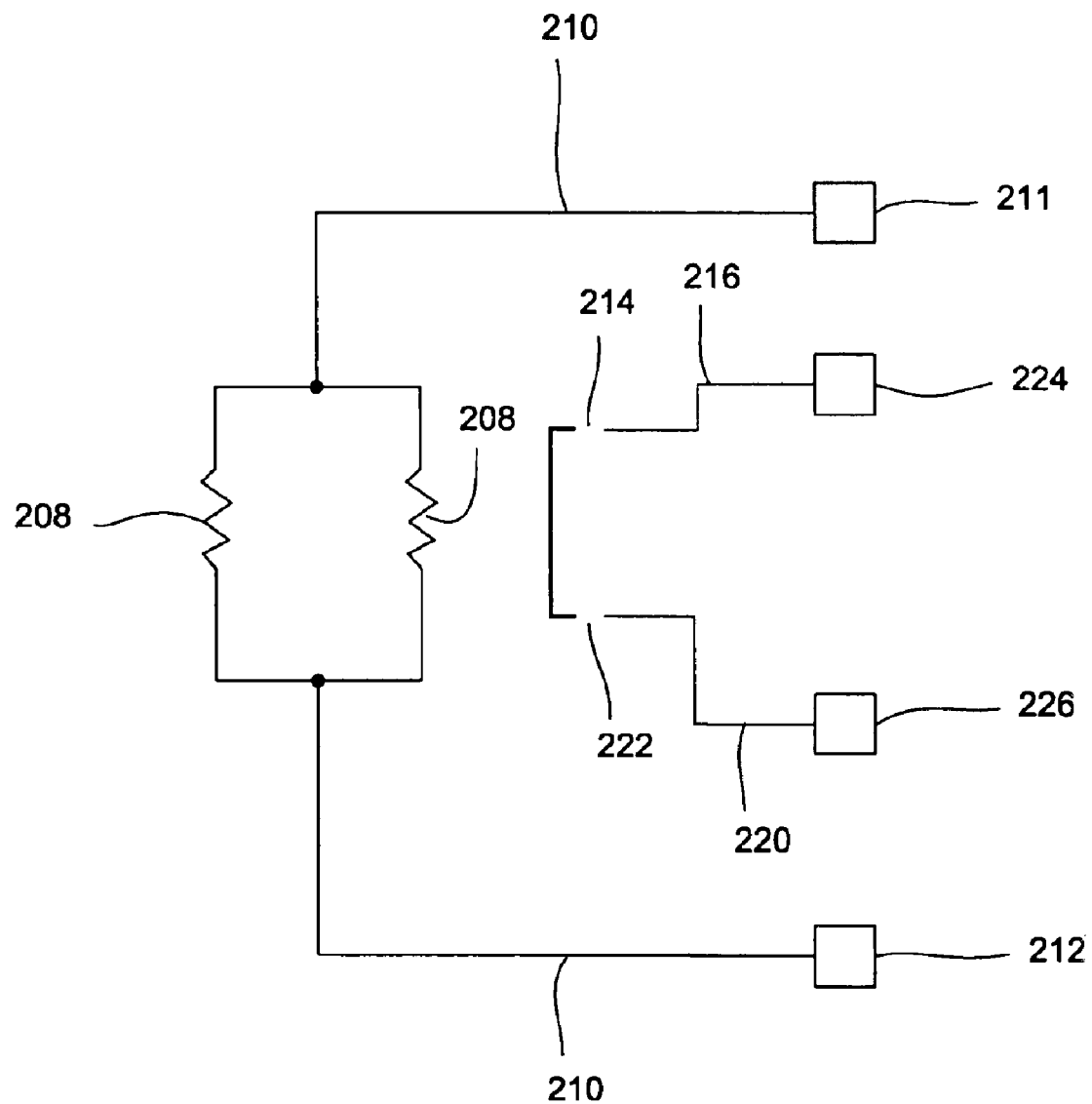
FIG. 10 is a simplified schematic view of a circuit diagram representing a single threshold level sensor in accordance with the principles of the present invention.

With reference to FIG. 10, transmission of the signal from the hot and cold thermocouple junctions 214, 222 is accomplished through the connection of leads 224 and 226 of the substrate 202 to leads 46 and 57 of the amplification circuit 70, respectively. The resulting signal from the amplification circuitry 70 is indicative of the fluid level and may be supplied to suitable remote indicating means for monitoring of the liquid level as sensed by printed circuit board 200.

Figure 13:
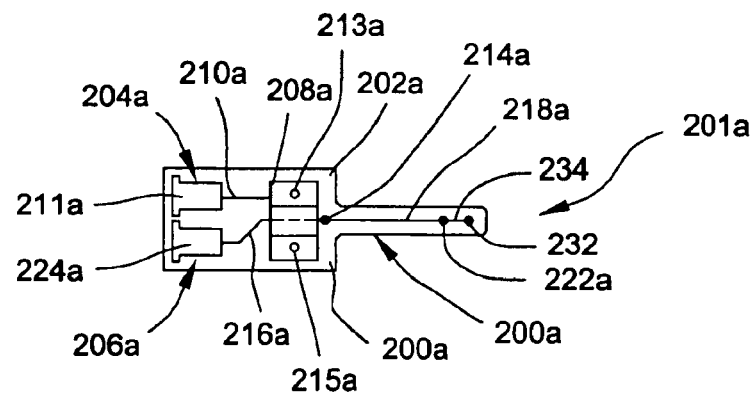
FIG. 13 is a plan view of a second embodiment of the single threshold level sensor.
Figure 14:
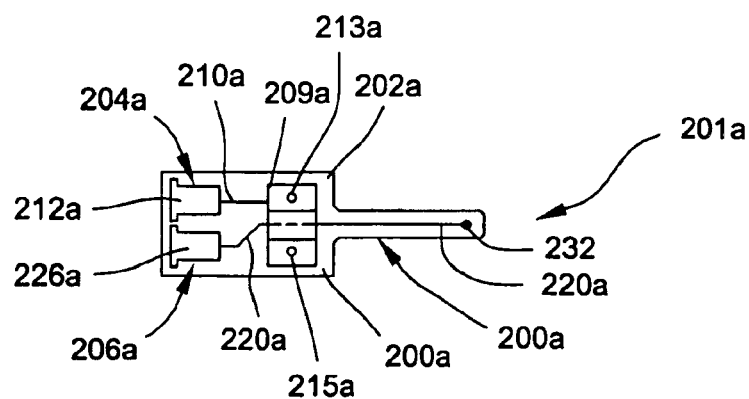
FIG. 14 is a view of the backside of the single threshold level sensor of FIG. 13.

Referring to FIGS. 13 and 14, a second embodiment of the single threshold level sensor (STLS) is provided and includes a printed circuit board 200a having a relatively rigid substrate 202a upon which a power supply circuitry 204a and a liquid level sensing assembly 206a are supported. In view of the substantial similarity in structure and function of the components associated with the STLS 201 with respect to the STLS 201a, like reference numerals are used hereinafter and in the drawings to identify like components, while like reference numerals containing letter extensions are used to identify those components that have been modified.

The liquid level sensing assembly 206a includes a pair of substantially identical heating resistors 208a, 209a that are positioned in spaced relationship on opposite sides of the substrate 202a, as best shown in FIGS. 13 and 14. The resistors 208a, 209a are connected in parallel through electrically conductive perforations 213a and 215a in the substrate 202a. Power is supplied to one end of the heating resistors 208a, 209a from power supply circuitry 204a via leads 210a. Specifically, a first set of contacts 211a, 212a is provided extending to power supply circuitry 204a for supplying power to printed circuit board 200a.

The liquid level sensing assembly 206a further includes a hot thermocouple junction 214a comprising the juncture between a first copper lead 216a and a Constantan lead 218a. The lead 216a runs beneath the heating resistor 208a. Constantan lead 218a extends across substrate 202a to a point where it is joined to a second copper lead 234 to thereby form a cold thermocouple junction 222a, as best shown in FIG. 13. In addition, a perforation 232 is disposed adjacent the cold thermocouple junction 222a to join second copper lead 234 with the third lead 220a that runs beneath resistor 209a. Specifically, the perforation 232 is filled with a conductive material for electrical communication with the third lead 220a and the cold thermocouple junction 222a through a second lead 234. It should be understood that the first and third copper leads 216a, 220a are electrically connected to a second and third contact 224a, 226a, whereby the second and third contacts 224a, 226a are disposed at a proximate end of the substrate 202a. In this manner, the second and third contacts 224a, 226a are disposed adjacent the first contacts 211a, 212a.

The first and second leads 216a, 220a are operable to transmit a signal from the hot and cold thermocouple junctions 214a, 222a to an external signal amplification circuitry 70 through the second and third contacts 224a, 226a. Specifically, as signals are transmitted from the hot and cold thermocouple junctions 214a, 222a to the second and third contacts 224a, 226a via leads 216a, 220a, the signals are received by the external amplification circuitry 70. It should be understood that while an amplification circuit 70 is disclosed by the present invention generally at FIG. 4, any suitable amplification circuit for amplifying the signals received from the hot and cold thermocouple junctions 214a, 222a, is anticipated and should be considered as part of the present invention.

In operation, the hot thermocouple junction 214a will generate a potential, the magnitude of which will be dependent upon its temperature. Assuming a sensor such as is shown in FIGS. 13 and 14, the total voltage generated when the probe is not immersed in liquid will be the potential generated by the single hot thermocouple junction 214a. However, if the hot thermocouple junction 214a is immersed in a liquid, the greater thermal transfer efficiency afforded by liquids as opposed to gaseous fluids will result in reduced heating of the immersed thermocouple junction 214a by the heating resistors 208a, 209a and hence a lower potential being generated thereby.

The amount of heat transferred to the hot thermocouple junction 214a, and hence the potential it may generate, is also influenced by ambient temperatures. In this manner, it is necessary to provide the cold thermocouple junction 222a in electrical communication with the hot thermocouple junction 214a. The orientation between the copper and Constantan leads for cold thermocouple junction 222a is reversed from that of the hot thermocouple junction 214a. This results in the cold thermocouple junction 222a generating a potential of opposite polarity to that of the hot thermocouple junction 214a. Thus, because the cold thermocouple junction 222a is connected in series with the hot thermocouple junction 214a, this opposite polarity potential will subtract from the potential generated by the hot thermocouple junction 214a. The value of the cold thermocouple junction 222a potential will be less than the potential produced by the hot thermocouple junction 214a because the heating resistors 208a, 209a maintain the hot thermocouple junction 214a at a temperature above ambient. Thus, as may be appreciated, the potentials produced by the hot and cold thermocouple junction 214a, 222a will produce a resulting potential which is indicative of whether or not the STLS 201a is immersed in a liquid.

As mentioned previously, the resulting signal produced by the thermocouple junctions 214a, 222a is supplied to an external amplification circuitry 70 via second and third contacts 224a, 226a. The amplification circuitry 70 is operable to amplify the thermocouple junction output signal and includes suitable filters to reduce electrical noise or the like, as shown in FIG. 4. Specifically, the signals received form the hot and cold thermocouple junctions 214a, 222a are transmitted to the amplifying circuit 70 generally at leads 46 and 57. The resulting signal from the amplification circuitry 70 is indicative of the fluid level and may be supplied to suitable remote indicating means for monitoring of the liquid level as sensed by printed circuit board 200a.

Figure 20:
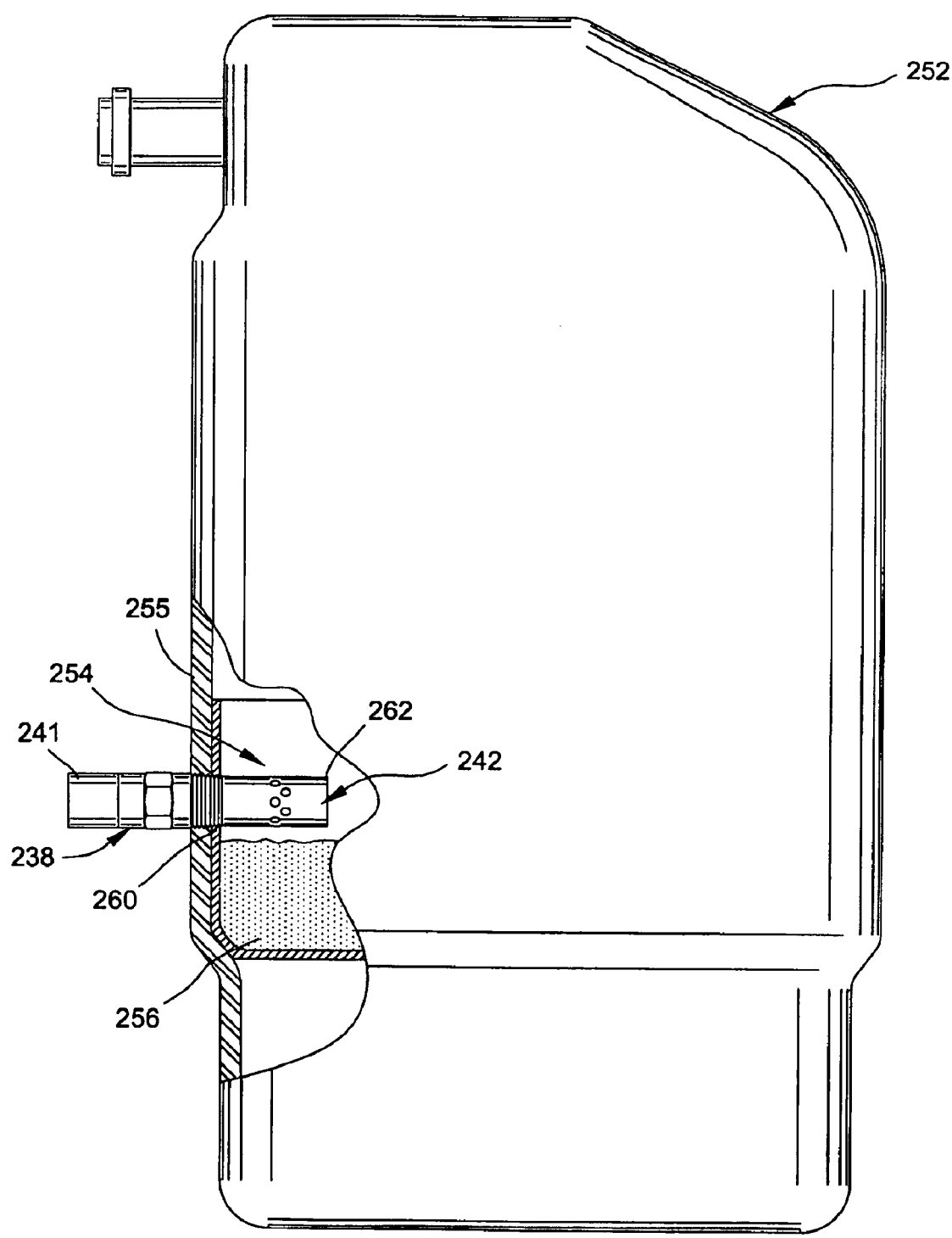
FIG. 20 is a perspective view of a container having a hermetic interface and single threshold level sensor in accordance with the principles of the present invention fixedly attached thereto.

Turning now to FIGS. 15–17 and 20, a hermetic interface 236 for use in combination with either the STLS 201 or STLS 201a is shown. While either the STLS 201 or STLS 201a may be used with the hermetic interface 236, the description of the STLS 201 is foregone as attachment for both the STLS 201 and the STLS 201a are generally identical. As depicted in FIG. 20, the hermetic interface 236 provides the STLS 201a with the ability to transmit a signal through the wall of a closed vessel while still maintaining the sealed nature of the vessel.

Figure 15:
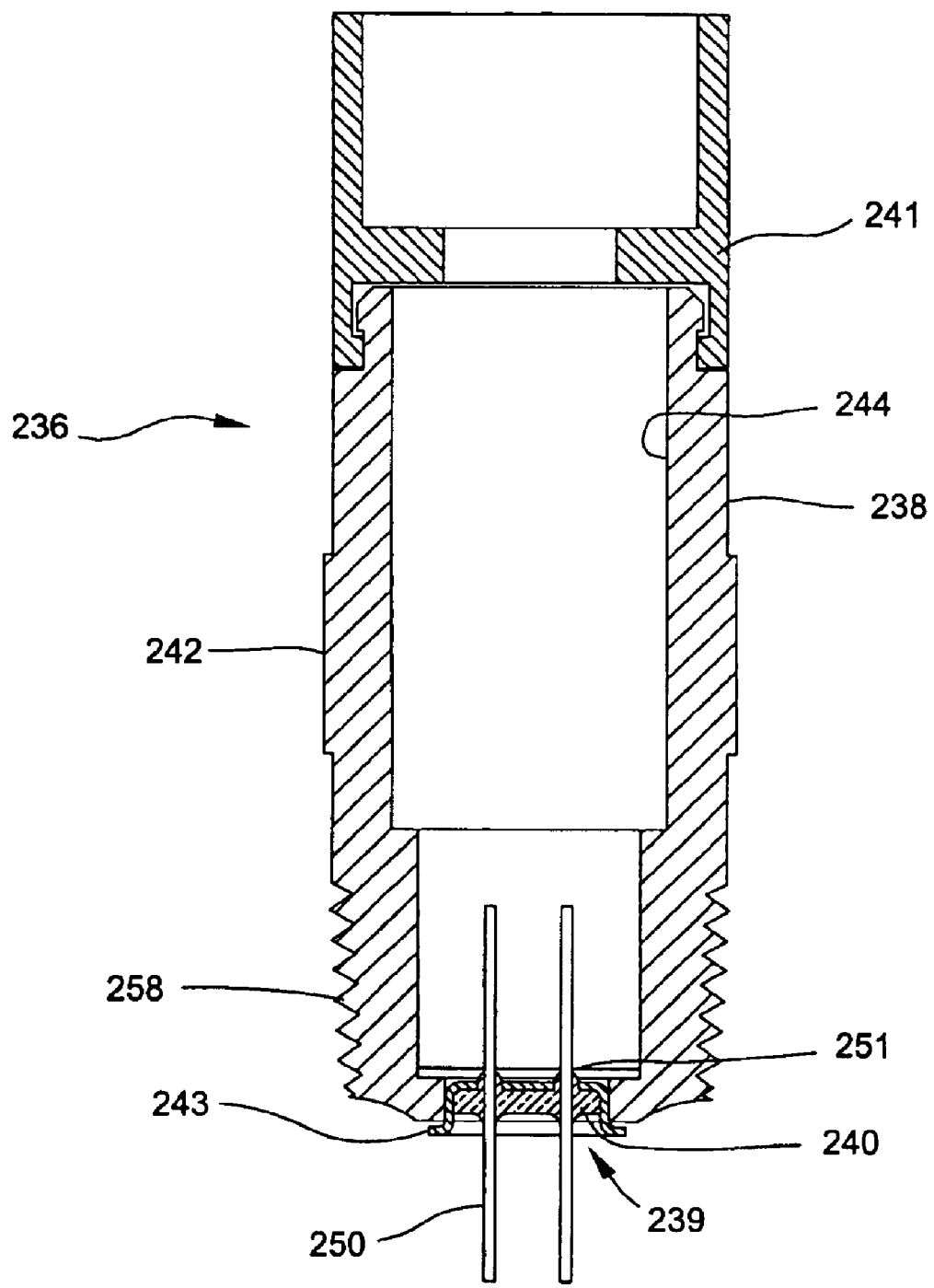
FIG. 15 is a cross-sectional front view of a hermetic interface in accordance with the principles of the present invention.

As shown in FIG. 15, the hermetic interface 236 includes a generally elongate cylindrical housing 238 having external screw threads 258 at one end and flats 242 to accommodate a wrench, for example. A bore 244 extends the length of the housing 238. At one end of the bore 244 is an hermetically sealed electrical feed through 239 comprising a metallic body 243 through which extend two sets of current conducting pins 250, 251 that are hermetically sealed in the body 243 by a glass-to-metal seal 240. The feed through 239 is fit into the bore 244 and hermetically sealed to the housing 238, such as by welding, brazing, solder, epoxy, other mechanical fastening or any suitable means. An end cap 241 may also be attached to the hermetic interface 236 at its end opposite the screw threads 258.

Figure 16:
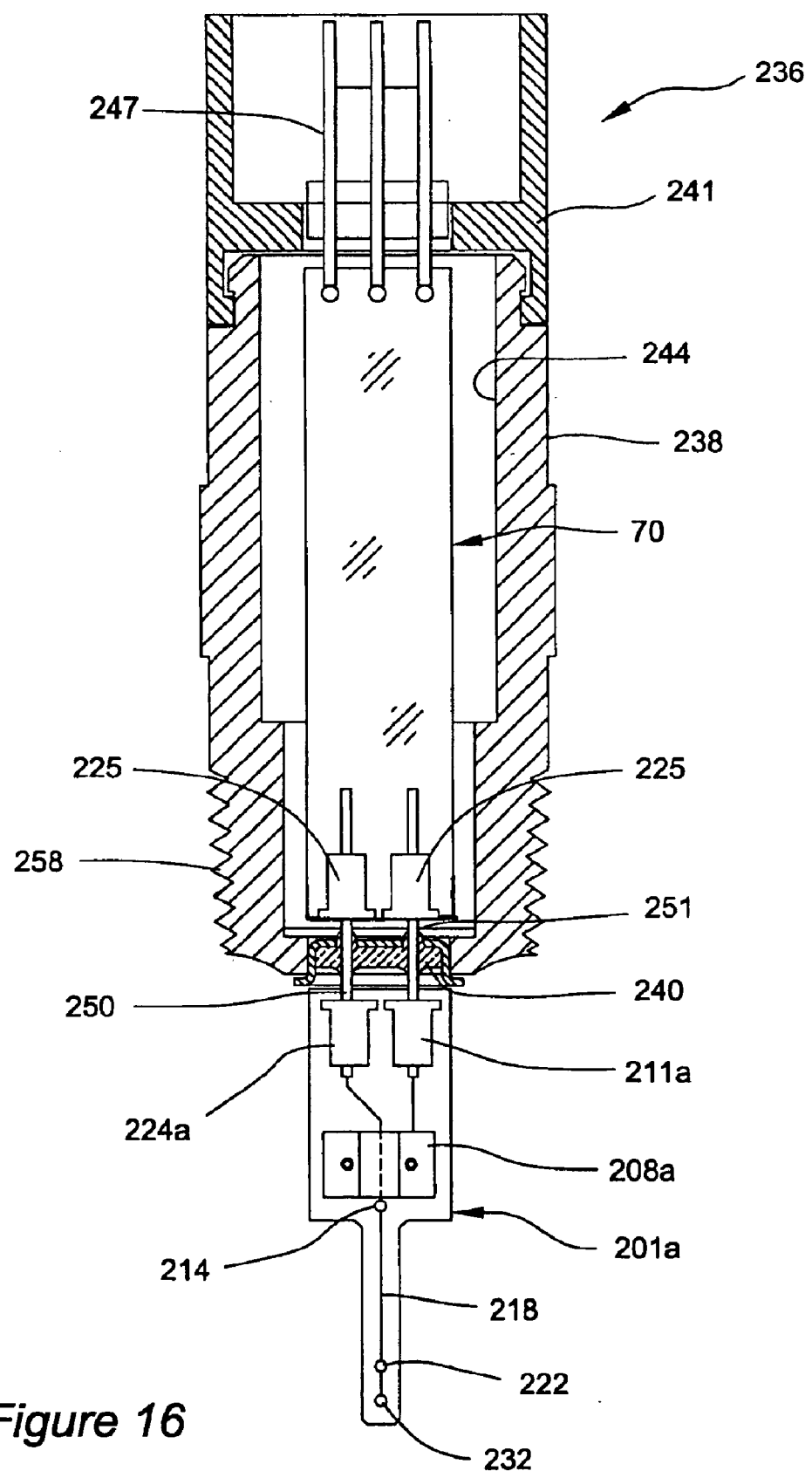
FIG. 16 is a cross-sectional front view of the hermetic interface of FIG. 15 and including a single threshold level sensor of the present invention disposed therein.

As best illustrated in FIG. 16, the housing 238 is adapted to receive within its bore 244 the amplifying circuit 70 (which, for example, may be formed on a printed circuit board). The amplifying circuit 70 connects to the pins 250, 251 of the feed through 239 at contacts 225. At the opposite end, the amplifying circuit 70 connects to a connector plug 247.

The STLS 201a connects to pins 250, 251 at contacts 211a, 212a, 224a, 226a. In particular, leads 46 and 57 of the amplifying circuit 70 are connected to the second and third contacts 224a, 226a via pins 250, while the first contacts 211a, 212a are connected to leads 251 to receive power. Contacts 224a, 226a and 211a, 212a are electrically connected to pins 250, 251 by a suitable means such as welding, mechanical fastening or any suitable means of attachment including epoxy or solder, or a combination thereof.

Once assembled with the hermetic interface 236, the STLS 201a may be used in a vessel 252 having a sealed compartment 254 (as shown in FIG. 20) for determining the presence of a predetermined amount of fluid 256 while concurrently maintaining the sealed nature of the vessel 252. Although the hermetic interface 236 is shown to be attached to the vessel 252 by threaded engagement with a wall 255 of the vessel 252, it should be noted that any suitable means for attaching the hermetic interface 236 to the vessel 252 that concurrently maintains the sealed relationship of the hermetic interface 236 with the opening, such as welding or epoxy, may also be used.

As shown in FIGS. 17–19 and 20, a protective shield 242 may also be provided to prevent damage to the STLS 201a, and further to prevent inaccurate readings caused by sloshing liquid 256 within the vessel 252. The shield 242 is a generally cylindrical member having a proximate end 260 fixedly attached to the housing 238 and a distal end 262 extending away from the housing 238. The shield 242 further includes a central bore 264 extending along its length (and may be optionally open or closed at its distal end 262), whereby the bore 264 is operable to receive the STLS 201a. The shield 242 includes a plurality of holes 266 or slots 268 to allow the liquid 256 to flow into and out of the bore 264 at a predetermined rate for interaction with the STLS 201a.

Alternatively, the protective shield 242 may be rigidly attached to the inside was 255 of vessel 252, instead of being attached to housing 238 of the hermetic interface 236. In this regard, the shield 242 may be attached to the vessel wall 255 from the interior of the vessel 252, such as by a threaded engagement, prior to the vessel 252 being sealed. Subsequently, the STLS 201a and its hermetic interface 236 may be attached from exterior of the vessel 252, with the STLS 201a being received within the shield 242 as the hermetic interface 236 is attached to the wall 255 of the vessel 252.

While it will be appreciated that the preferred embodiments of the invention disclosed are well calculated to provide the advantages and features above stated, it will be appreciated that the invention is susceptible to modification, variation and change without departing from the proper scope or fair meaning of the subjoined claims.

We claim:

1. A liquid level sensor comprising:
   a substrate having a first axis:
   a first electric circuit comprising a first thermocouple junction and a second thermocouple junction disposed on said substrate, said second thermocouple junction located in a spaced relationship from said first thermocouple junction along said first axis;
   a second electric circuit comprising a heat source disposed on said substrate for raising the temperature of said first thermocouple junction above an ambient temperature; and wherein
   said sensor is adapted to be disposed within a vessel containing a volume of fluid defining a fluid level such that said first axis is generally parallel with said fluid level and said first and second thermocouple junctions cooperate to generate a signal indicative of said fluid level.

2. A liquid level sensor as set forth in claim 1 wherein said second thermocouple junction is operative to generate a compensating signal indicative of ambient temperature.

3. A liquid level sensor as set forth in claim 2 wherein said first thermocouple junction generates a signal of a first polarity and said second thermocouple junction generates a signal of opposite polarity.

4. A liquid level sensor as set forth in claim 1 wherein said heat source comprises a plurality of spaced heaters.

5. A liquid level sensor as set forth in claim 4 wherein said heaters comprise discrete resistors.

6. A liquid level sensor as set forth in claim 1 wherein said second circuit further comprises a regulated power source for supplying power to said heat source.

7. A liquid level sensor as set forth in claim 1 wherein said first electric circuit further comprises signal conditioning circuitry.

8. A liquid level sensor as set forth in claim 7 wherein said signal conditioning circuitry comprises an amplifier.

9. A liquid level sensor as set forth in claim 1 further comprising a shield covering a first thermocouple junction and a second thermocouple junction.

10. A liquid level sensor as set forth in claim 9 wherein said shield includes openings such that said fluid may flow into and out of said openings.

11. A liquid level sensor comprising:
    a substrate having a first axis;
    a first thermocouple junction disposed on said substrate;
    a second thermocouple junction disposed on said substrate in a spaced relationship along said first axis relative to said first thermocouple junction, said second thermocouple junction being in electrical series with said first thermocouple junction;
    a heat source for raising the temperature of said first thermocouple junction above an ambient temperature; and wherein
    said sensor is adapted to be disposed within a vessel containing a volume of fluid defining a fluid level such that said first axis is generally parallel with said fluid level and said first and second thermocouple junctions cooperate to generate a signal indicative of said fluid level.

12. A liquid level sensor as set forth in claim 11 wherein said first thermocouple junction generates a first magnitude signal when positioned at a level above the surface of said liquid and a second magnitude signal when positioned at a level below said surface of said liquid, the first and second magnitude signals being indicative of the level of said liquid within said vessel.

13. A liquid level sensor as set forth in claim 12 wherein said second thermocouple junction generates a signal indicative of the ambient temperature within said vessel.

14. A liquid level sensor as set forth in claim 13 wherein said first magnitude signal is greater than said second magnitude signal.

15. A liquid level sensor as set forth in claim 11 wherein said first and second thermocouple junctions are electrically connected by a Constantan wire.

16. A liquid level sensor as set forth in claim 11 further comprising a thermally conductive electrically insulating coating encapsulating said sensor.

17. A liquid level sensor as set forth in claim 16 wherein said coating is operative to shed droplets of said liquid.

18. A liquid level sensor as set forth in claim 11 wherein said heat source comprises a resistance heater.

* * * * *